April 12, 1960  C. J. SCRANTON  2,932,145
HARVESTER THRESHER AND STRAW EXHAUSTER THEREFOR
Filed Dec. 21, 1956  2 Sheets-Sheet 2
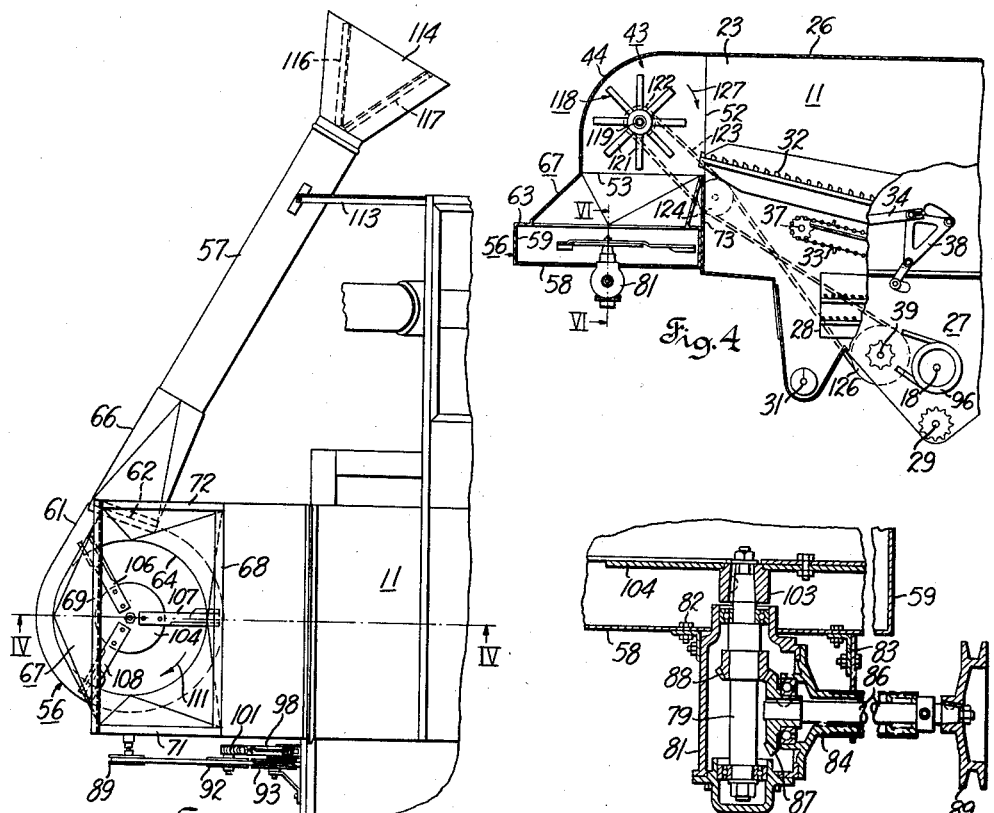
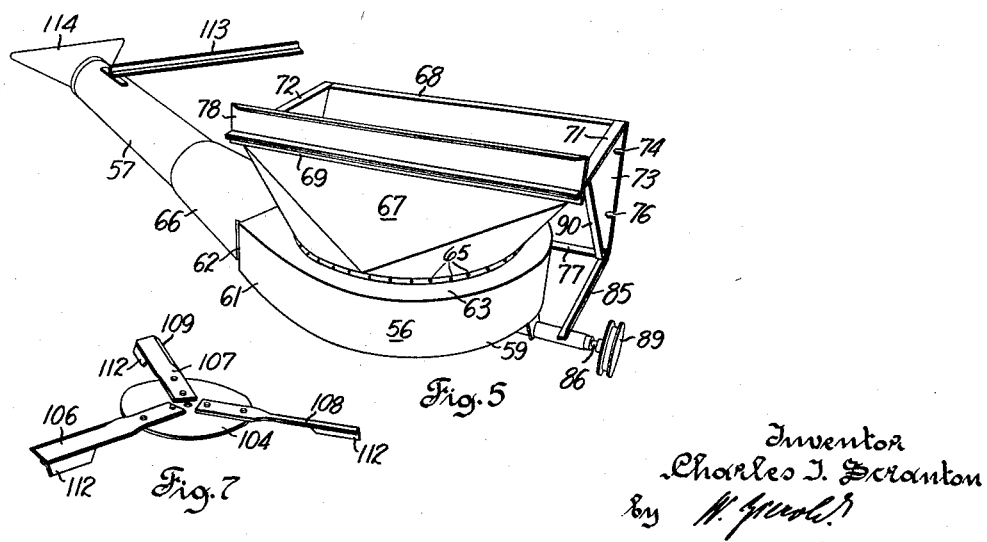
Inventor
Charles J. Scranton
by
Attorney

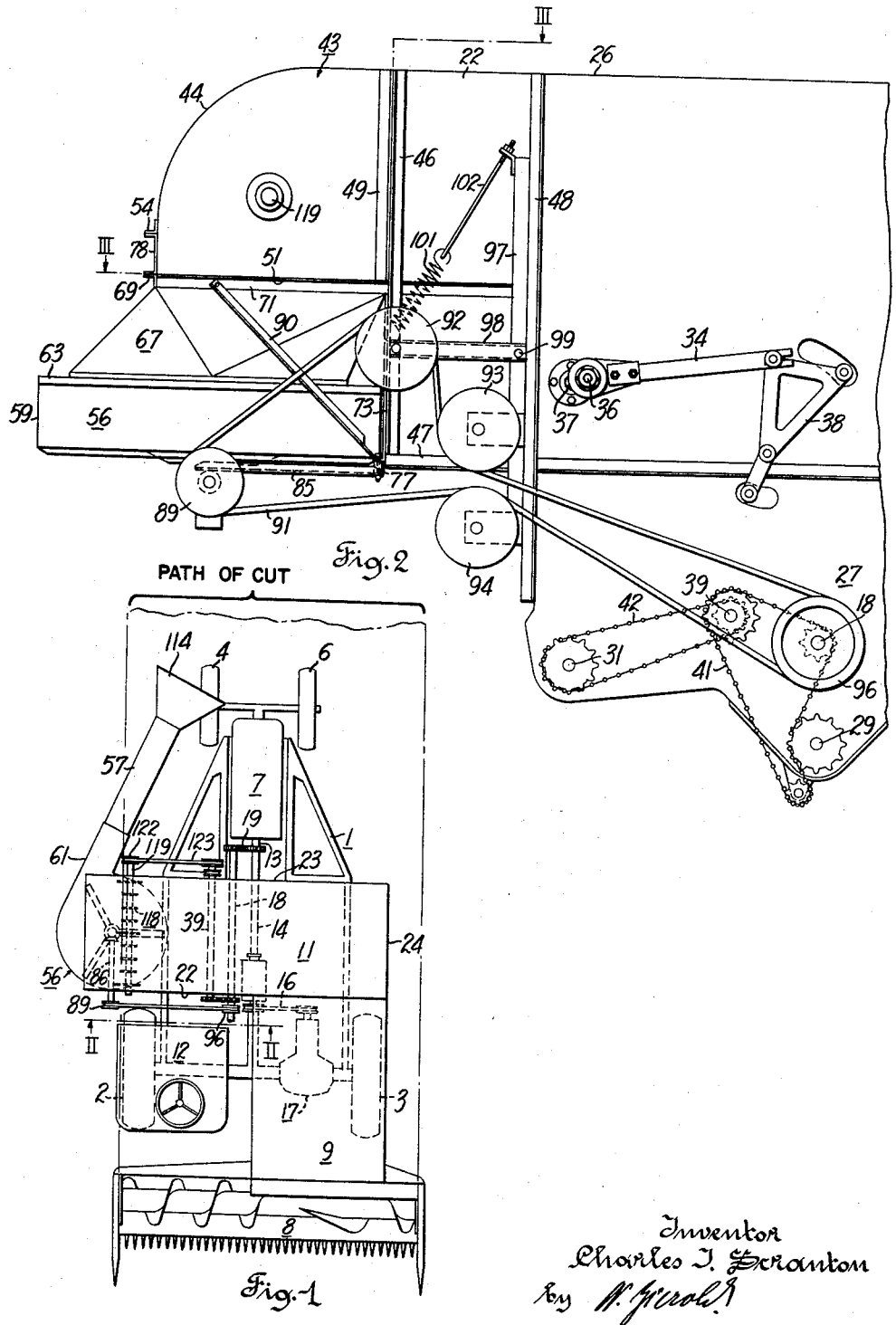

United States Patent Office 2,932,145
Patented Apr. 12, 1960

2,932,145

HARVESTER THRESHER AND STRAW EXHAUSTER THEREFOR

Charles J. Scranton, La Porte, Ind., assignor to Allis-Chalmers Manufacturing Company, Milwaukee, Wis.

Application December 21, 1956, Serial No. 629,896

6 Claims. (Cl. 56—122)

The invention relates to harvester threshers, and it is concerned more particularly with the handling of the waste material, generally in the form of straw, which is discharged from the separator mechanism of such machines.

In the harvesting of crops by means of a harvester thresher or combine, the waste material which is discharged from the separating mechanism is usually disposed of by leaving it on the field and by plowing it under when the land is prepared for the next crop. If long straw is dropped from the machine or if the material is deposited in bunches, such plowing under becomes difficult, and various types of straw choppers and spreaders for use with combines have heretofore been suggested which were intended to avoid this difficulty. However, the provision of an efficient and fully satisfactory device which will scatter the waste material discharged from a combine properly under a wide variety of operating conditions presents a major problem and involves a number of difficulties.

One of these difficulties is the unevenness with which the straw is discharged from the separator under varying conditions of crop density and which causes the mentioned deposit of the straw in bunches.

Another difficulty is the excessive spreading of dust, along with the straw, which causes considerable discomfort to the operator. In combines of the cross feed separator type in which the straw is discharged at one side of the machine, the dust problem is aggravated by the fact that the straw discharge end of the separator is closer to the operator's station than in the straight through type of machine in which the straw discharge end of the separator is at the extreme rear of the machine and directly over the path of cut.

Other difficulties which have heretofore been encountered with straw spreaders or choppers for combines are the tendency to plug, particularly when large weeds are passed through the machine along with the crop; and the need for stopping the machine when it is desired to unload the grain bin into a low wagon alongside the machine, because operation of the spreader would make it impractical to unload into such a wagon on the go. Further, the lateral straw discharge from machines of the cross feed separator type is objectionable under certain conditions, as when opening up a field or in strip farming where it is not desired to deposit the straw on the material next to the machine; and fast rotating, exposed slinger elements which have heretofore been used in straw spreaders constitute a hazard to attendant persons.

Generally, it is an object of the invention to provide an improved combine harvester of the cross feed separator type.

More particularly it is an object of the invention to provide a combine harvester which on one hand has the inherent advantages of the cross feed separator type, that is, a compact and well balanced arrangement of its component parts, and which on the other hand avoids the difficulties which have heretofore been encountered with that type of machine, particularly in the matter of covering adjacent land with straw from the combine and of contaminating the air at the operator's station by flying straw particles and dust.

A further object of the invention is to provide an improved cross feed separator combine of the hereinabove outlined character which will deposit the waste material on the ground in such form that it can be readily plowed under when the land is prepared for the next crop.

A still further object of this invention is to provide an improved combine harvester of the hereinabove outlined character which will successfully operate without clogging even if the crop being harvested is infested with relatively large and thick stemmed weeds.

A still further object of the invention is to provide an improved combine harvester of the hereinabove outlined character in which the discharge of waste material will not interfere with the unloading of the grain bin into an adjacent low wagon so that the grain bin may be unloaded on the go.

A still further object of the invention is to provide an improved combine harvester of the hereinabove outlined character which is devoid of exposed fast rotating spreader parts or the like which would be a hazard to attendant persons.

These and other objects and advantages are attained by the present invention, various novel features of which will be apparent from the description herein and the accompanying drawings disclosing an embodiment of the invention, and will be more particularly pointed out in the appended claims.

In the drawings:

Fig. 1 is a schematic outline, in plan, of a self-propelled combine including a straw exhauster and driving connections therefor;

Fig. 2 is an enlarged front view of part of the machine outlined in Fig. 1, the view of Fig. 2 being taken on line II—II of Fig. 1;

Fig. 3 is a plan view, on a reduced scale and partly in section, on line III—III of Fig. 2, of parts shown in Fig. 2;

Fig. 4 is a sectional elevation on line IV—IV of Fig. 3;

Fig. 5 is a perspective view of a centrifugal blower and associated parts shown in Figs. 2, 3 and 4;

Fig. 6 is an enlarged sectional view on line VI—VI of Fig. 4, of a gear mechanism and associated parts at the bottom of the blower shown in Fig. 5; and Fig. 7 is a perspective view of a rotary knife and vane assembly of the blower shown in Fig. 5.

The combine harvester outlined in Fig. 1 is of the cross feed separator type and comprises the usual components of such a machine, namely, a main frame 1 which is supported on a forward pair of driving wheels 2 and 3 and on a rearward pair of steerable wheels 4 and 6; an engine 7; a header 8; threshing mechanism 9; cross feed separator mechanism 11; and operator's station 12. The threshing mechanism 9 is mounted rearwardly of the header 8 in overlying relation to the path of cut defined by the header. More particularly, the threshing mechanism 9 extends transversely of said path of cut adjacent to one side and in laterally offset relation to the other side thereof. The separator mechanism 11 for the material which is discharged from the threshing mechanism 9 includes a housing structure which will be described more fully hereinbelow and which is mounted rearwardly of the threshing mechanism in overlying relation to the path of cut of the header 8. Power for driving the forward supporting wheels 2 and 3 is derived from the engine by a conventional power transmitting mechanism including a clutch shaft 13, a line shaft 14, a variable speed V-belt drive 16, and a transmission and differential unit 17.

Power for driving various elements of the header 8, threshing mechanism 9, separator 11, and certain grain handling conveyors, not shown, is derived from a countershaft 18 which extends parallel to the line shaft 14 and to which engine power is transmitted from the clutch shaft 13 by means of a chain drive 19. In Fig. 1 the countershaft 18 is shown broken off at its forward end for purposes of simplification, it being understood that conventional power transmitting mechanisms, not shown, are provided to supply the header 8 and threshing mechanism 9 with the required driving power from the countershaft 18.

The separator 11 comprises a conventional transversely extending housing structure having parallel front and rear walls 22 and 23, respectively, an end wall 24 and a top wall 26 partly shown in Fig. 4. The left end of the separator housing, that is, the end at the side of the machine which is to the left of an operator facing forwardly on station 12, is closed by the end wall 24, and at its under side the separator housing communicates as usual with a cleaning shoe 27 containing reciprocating sieves 28, a clean grain auger having a shaft 29, a tailings auger having a shaft 31 and other instrumentalities, not shown. A reciprocating straw rack 32 and a grain drag 33 within the separator housing are partly shown in Fig. 4 and of conventional construction. The straw rack 32 and sieves 28 are reciprocated by pitman and rocker drives at the forward and rearward sides, respectively, of the separator housing, the pitman and rocker drive at the forward side being best shown in Fig. 2 and comprising a pitman 34 connected with a crank 36 on grain drag drive shaft 37 (Fig. 4), and a rocker 38. The pitman and rocker drive at the forward side of the separator housing is duplicated at the rear side of the separator housing but not shown in the drawings. Power transmitting mechanism for driving the grain drag shaft 37 and other moving parts of the separator 11 is of conventional construction and includes a separator drive shaft 39 which, as shown in Fig. 1, extends parallel to the countershaft 18 and projects forwardly and rearwardly from the separator 11. As best shown in Fig. 2, power is transmitted from the countershaft 18 to the separator drive shaft 39 and also to the clean grain auger shaft 29 by a chain drive 41 of conventional construction. The tailings auger shaft 31 is driven by another conventional chain drive 42.

A straw hood 43 of conventional construction is mounted in an overhanging position at the right end of the separator 11, vertical front and rear walls of the straw hood forming continuations of the front and rear walls 22 and 23, respectively, of the separator housing, and a curved top wall 44 of the straw hood 43 forming a contnuation of the top wall 26 of the separator housing. The front wall 22 of the separator housing, as shown in Fig. 2, has an angle iron 46 attached to it along its vertical edge at the discharge end of the housing, and another angle iron 47 at right angles to the angle iron 46 is secured to the separator front wall 22 along its bottom edge. The separator 11 also includes a vertical frame post 48 at the forward side of front wall 22 in proximity to the forwardly projecting end of the grain drag drive shaft 37, the post 48 extending downwardly beyond the horizontal angle iron 47 and being connected to the cleaning shoe 27 at the discharge end of the latter. The front wall of the straw hood 43 has an angle iron 49 attached to it along a vertical edge thereof adjacent to the vertical angle 46 of the separator housing, and the angle iron 49 is secured to an abutting part of the angle iron 46 by connecting bolts, not shown. A straight bottom edge 51 of the straw hood front wall extends in a horizontal plane about midway between the upper and lower ends of the angle iron 46.

In Fig. 4, the rear wall 23 of the separator 11 and the rear wall of the straw hood 43 are shown abutting each other along vertical line 52, the arrangement of angle irons 46 and 49 explained hereinabove with reference to Fig. 2 being repeated, but not shown, at the rear side of the separator housing to secure the rear wall of the straw hood 43 to the rear wall 23 of the separator housing. A straight bottom edge of the straw hood rear wall is indicated at 53 in Fig. 4 and extends in the same horizontal plane as the bottom edge 51 of the straw hood front wall shown in Fig. 2. The curved top wall 44 of the straw hood 43 is suitably connected at its upper end to the top wall 26 of the separator housing. At its lower end the curved top wall 44 has a straight horizontal edge at a short distance above the horizontal plane of the edges 51 and 53, and an angle iron, as indicated in Fig. 2, is secured to the lower end of the straw hood top wall 43 to present an outwardly extending flange 54.

The bottom aperture of the straw hood 43 which is defined by the edges 51, 53 and flange 54 is, in effect, the straw discharge opening of the separator 11, and by reference to Fig. 1 it will be noted that said straw discharge opening is at the right side of the path of cut defined by the header 8.

A centrifugal blower generally designated by the reference character 56 is mounted at the right end of the separator 11 in position to receive straw from the discharge opening 51, 53, 54, and a pipe 57 provides a delivery passage of the blower which is directed toward the path of cut defined by the header 8. As will be explained more fully hereinbelow, the blower 56 is operative to chop the straw and eject it together with a current of high velocity air from the delivery passage 57.

A volute housing of the blower 56 comprises a plane, generally circular bottom wall 58, Figs. 4 and 6, which closes the under side of the housing; a volute circumferential wall 59 which rises at right angles from the bottom wall 58 and which includes a tangential section 61, Fig. 3, extending parallel to the axis of pipe 57, and a rectangular outlet opening 62 in a vertical plane at approximately right angles to the axis of pipe 57; and a generally ring shaped top wall 63 which is joined at its outer periphery to the upper edge of the circumferential wall 59 and whose inner, circular periphery presents a central, axial inlet opening 64 of the blower housing. A tubular adapter section 66 rectangular at one end and round at the other, is interposed between the rectangular outlet opening 62 of the volute blower housing and the cylindrical delivery pipe 57. The adapter section 66 and the pipe 57 represent duct means which are operatively associated with the peripheral material outlet opening 62 of the volute blower housing and which, as shown in Fig. 1, extend therefrom in a generally rearward direction toward the center of the path of cut in rear of the harvester thresher.

Shielding means in the form of a sheet metal chute 67 connect the blower 56 in straw receiving, sealed relation with the straw hood 43. The chute 67 has a circular lower end of a diameter conforming with the diameter of the circular inlet aperture 64 of the blower housing to which it is sealingly connected, as by spot welding 65 (Fig. 5). The upper end of the chute 67 is rectangular and, as shown in Fig. 3, has a pair of longitudinal flanges 68, 69 at its long, transversely opposite top edges, and a pair of transverse flanges 71 and 72 at its short, longitudinally opposite top edges. The length of the longitudinal flanges 68 and 69 conforms with the spacing of the straw hood front and rear walls from each other which is the same as the spacing between the front and rear walls 22 and 23 of the separator housing. The length of the transverse flanges 71 and 72 conforms with the length of the bottom edges 51 (Fig. 2) and 53 (Fig. 4) of the straw hood side walls.

As indicated in Fig. 5, the top flange 68 of the chute 67 is joined to the upper edge of a filler panel 73, which is dimensioned so that in the mounted condition of the blower 56 on the combine as shown in Figs. 1 to 4 the filler panel 73 extends across and closes the normally open space below the straw rack 32 at the discharge end of the separator housing. Notches 74 and 76, Fig. 5, in the vertical forward edge of the filler panel 73 are provided to receive fastening bolts, not shown, for securing the filler panel, and thereby the blower 56, to the angle iron 46 at the forward side of the separator housing. Similar provisions are made, but not shown, for securing the filler panel 73 at its vertical rearward edge to a vertical angle iron at the rear side of the separator housing. The bottom edge of the filler panel 73 is reinforced by an angle iron 77, Fig. 5, and as shown in Fig. 2, the filler panel only closes the portion of the separator housing below the straw rack 32 but it does not close the discharge opening of the cleaning shoe 27 and from which the chaff is blown outward by conventional means, not shown, into the open space below the blower 56.

As shown in Fig. 2, the bottom edge 51 of the straw hood front wall and the top flange 71 of the chute 67 bear vertically upon each other, and the bottom edge 53, Fig. 4, of the straw hood rear wall similarly bears upon the top flange 72, Fig. 5, of the chute 67 when the blower 56 is in its installed position on the combine. The flange 54 along the bottom edge of the curved straw hood top wall 44 is spaced vertically from the common horizontal plane of the edges 51, 53, and a straw hood extension plate 78, also shown in Fig. 5, is placed between the flanges 54 and 69 in order to close the gap between the bottom edge of the curved top wall 44 of the straw hood and the longitudinal top flange 69 of the chute 67. Bolts, not shown, are provided to securely fasten the straw hood extension plate 78 to the flange 54 of the straw hood and to the flange 69 of the chute 67.

Referring to Fig. 6, which is a section on line VI—VI of Fig. 4, a vertical shaft 79 is mounted in a gear housing 81 which is secured to the bottom plate 58 of the blower housing. The shaft 79 and an upper portion of the gear housing 81 extend upwardly through a central aperture of the plate 58 and the gear housing 81 is secured in place on the bottom plate 58 by bolted connections, including cap screws 82 and a hanger bracket 83. The gear housing 81 includes a tubular arm 84 which extends at right angles to the axis of the shaft 79 and is supported in the hanger bracket 83. Rotatably mounted in the tubular housing arm 84 is a pulley shaft 86 which is geared to the vertical shaft 79 by means of a pair of bevel gears 87 and 88. A V-belt pulley 89 is keyed to the outer end of the shaft 86 and, as shown in Figs. 1, 3 and 5, the pulley 89 is positioned at the forward side of the blower 56 for rotation on an axis which extends parallel to the axis of the countershaft 18, Fig. 1. As shown in Fig. 2, a V-belt 91 is trained about the pulley 89, idlers 92, 93, 94, and a driving pulley 96 which is secured to the countershaft 18. The idlers 93 and 94 are rotatably mounted on a bracket structure 97 which is detachably secured to the post 48 at the forward side of the separator housing. The idler 92 is mounted for vertical swinging movement by means of an arm 98 which has a pivot connection 99 with the bracket 97 and which is biased in belt tensioning direction by a spring 101 anchored to the bracket 97 by means of an adjusting rod 102.

A brace 85, Figs. 2 and 5, is mounted on the bottom angle iron 77 of the filler panel 73 and is secured to the tubular arm 84 of the gear casing 81 in order to take up driving strains imposed upon the belt pulley 89 and gear housing 81 by the V-belt 91. A diagonal brace 90, Fig. 2, extends from the bottom angle 77 of the filler panel 73 to the flange 71 at the forward side of the chute 67, and a similar diagonal brace, not shown, extends between angle iron 77 and flange 72 at the rearward side of the chute 67. The delivery pipe 57 is supported at its rear end on the frame structure of the harvester thresher by means of a brace 113 as indicated in Fig. 3.

A deflector 114 at the discharge end of the delivery pipe 57 comprises a top plate which extends in a generally horizontal direction from the upper part of the tube 57, and a pair of diverging fins 116 and 117 at the underside of the top plate and in the path of particles ejected from the delivery pipe 57.

As shown in Figs. 3, 6 and 7, a hub 103 is keyed to the upper end of the vertical shaft 79, and a horizontal disk 104 is secured to the hub 103 for rotation therewith. Rigidly secured to the disk 104 at 120° angular spacings are three chopping arms 106, 107 and 108 which are constructed as follows. Referring to Fig. 7, each chopping arm comprises a flat plate steel section which is bolted face to face to the upper side of the disk 104, and an elongated radially outward extending section which is sharpened along one edge as indicated in Fig. 7 at 109 for the chopping arm 107. The section of each chopping arm which extends radially outward from the disk 104 is slightly twisted relatively to the plane of the disk 104 so as to elevate the sharpened edge of the arm relative to the plane of the disk 104. The arrow 111 in Fig. 3 indicates the direction in which the rotor assembly comprising the shaft 79, disk 104 and arms 106, 107 and 108 are rotated in operation of the blower, and it will be noted that the sharpened, elevated edges of the chopping arms are at the leading sides of the arms. Each arm 106, 107, 108 also has an impeller vane 112, as indicated in Fig. 7. The vanes 112 are rigidly secured to the outer ends of the arms 106, 107 and 108 and extend from the trailing edges of these arms obliquely downward, that is, toward the bottom wall 58 of the blower housing.

When the harvester thresher is operated in the field, the crop cut by the header 8 passes from the latter in a rearward direction through the threshing mechanism 9 and then in a lateral direction through the separating mechanism 11. The separating mechanism has a threshed material inlet end adjacent wall 24 in rear of the threshing mechanism 9 and a straw outlet end at 52 (Fig. 4) which is spaced from the material inlet end in the mentioned lateral direction of material passage through the separator. The material chopping and impelling blower 56 is mounted in an axially upright position adjacent to the side of the path of cut toward which the threshed material is conveyed by the straw rack 32 of the separator mechanism so that the material inlet opening 64 of the volute blower housing is presented in receiving relation to the straw which is delivered by the separator mechanism. As best shown in Fig. 4, the straw passes from the straw rack 32 into the hood 43 and from there through the chute 67 into the inlet opening 64 of the blower housing. The chopping arms 106, 107 and 108 which revolve at high speed within the volute blower housing exert a chopping action upon the straw which passes through the inlet passage 64, such chopping action being produced by a rotary accelerating impact of the sharpened edges of the arms 106, 107 and 108 upon the incoming material. The impeller vanes 112 function to additionally impart rotary movement to the chopped straw, and the twisted shape of the arms together with the vanes 112 set up a high velocity air current in the direction from the straw hood 43 to the discharge end of the delivery pipe 57. The straw particles which are swirled around within the blower housing by the rotating chopping arms and by the air current, pass along the tangential section 61 of the blower housing and emerge through the outlet passage 62 at high velocity into the delivery passage 57. When the high velocity particles impinge upon the diverging fins 116, 117 of the deflector 114, they are diverted from the axial direction of the pipe 57 and spread out over the path of cut defined by the header 8. In this manner, an operator on station 12 is well protected from dust and dirt; also the straw will be spread out without bunching even if the crop intake at the header should at times be abnormally large.

Passage of the straw from the straw rack 32 into the inlet aperture 64 of the blower housing may under certain crop conditions become difficult due to bridging of the material within the chute 67. In order to avoid any such difficulty a rotary beater 118 is installed within the straw hood 43 as shown in Figs. 1 and 4. The beater 118 comprises a fore and aft extending shaft 119 which carries a set of circumferentially and axially spaced flails 121. At the rear side of the straw hood 43, a V-belt pulley 122, Fig. 1, is keyed to the shaft 119, and a V-belt 123 is trained over the pulley 122, over an idler 124, Fig. 4, and over a driving pulley 126, Fig. 4, on the rear end of the separator drive shaft 39. The beater 118 is preferably of the type shown in U.S. Patent 2,740,247, granted April 3, 1956, to R. L. Worrell for Straw Spreader for Combines. The arrow 127 in Fig. 4 indicates the direction in which the flails 121 rotate in operation of the machine. The function of the beater 118 is not only to break up the straw which is discharged from the straw rack 32, but also to impart to it sufficient velocity so that it will pass through the chute 67 without bridging.

It should be understood that it is not intended to limit the invention to the particular forms and details described hereinabove, and that the invention includes such other forms and modifications as are embraced by the scope of the appended claims.

What is claimed is:

1. In a harvester thresher of the type wherein harvested material is passed from a header in a rearward direction through a threshing mechanism and then in a lateral direction through a separating mechanism having a threshed material inlet end in rear of said threshing mechanism and a straw outlet end spaced in said lateral direction from said inlet end, the combination of a straw hood connected with said straw outlet end of said separator mechanism and presenting a downwardly facing straw discharge opening, a centrifugal blower having a volute housing on a vertical axis mounted under said straw hood in straw and air receiving relation to said discharge opening said blower including a rotor having arms with cutting and impelling portions; and a duct connected in material receiving relation to a peripheral outlet opening of said blower housing and directed rearwardly from the latter toward the longitudinal centerline of said harvester thresher, said blower being operative to chop straw delivered thereto from said straw hood and to eject said chopped straw together with a current of high velocity air from said duct.

2. A harvester thresher as set forth in claim 1 and further comprising a deflector mounted at the delivery end of said duct in cooperative relation to the chopped straw ejected therefrom, said deflector being operative to disperse said straw transversely of the direction of travel of said harvester thresher.

3. A harvester thresher as set forth in claim 1 and further comprising shielding means between said straw hood and said volute blower housing for connecting the latter in sealed relation with said straw hood.

4. A harvester thresher as set forth in claim 1, and further comprising a connecting chute between said straw hood and said volute blower housing said connecting chute having a rectangular upper part sealingly connected to said straw hood, and a circular lower part sealingly connected to a circular inlet opening of said blower housing.

5. A harvester thresher as set forth in claim 4 and further comprising a rotary beater within said straw hood in overlying relation to said connecting chute and operative to accelerate straw for passage through said connecting chute into said blower without bridging.

6. In a harvester thresher of the type wherein harvested material is passed from a header in a rearward direction through a threshing mechanism and then in a lateral direction through a separating mechanism having a threshed material inlet end in rear of said threshing mechanism and a straw outlet end spaced in said lateral direction from said inlet end, the combination of a blower structure including a volute housing having axial and peripheral material inlet and outlet openings, respectively and a rotor having arms with cutting and impelling portions; means operatively mounting said blower in an axially vertical position at said straw outlet end of said separator mechanism so as to receive straw therefrom through said axial material inlet opening of said blower housing; and duct means operatively associated with said peripheral material outlet opening of said blower housing and extending therefrom in a generally rearward direction toward the longitudinal center line of said harvester thresher.

References Cited in the file of this patent

UNITED STATES PATENTS

| 2,340,457 | Dion | Feb. 1, 1944 |
| 2,554,669 | Elofson | May 29, 1951 |
| 2,645,500 | Moss | July 14, 1953 |
| 2,701,596 | Myrold | Feb. 8, 1955 |
| 2,740,247 | Worrell | Apr. 3, 1956 |

FOREIGN PATENTS

| 850,818 | Germany | Sept. 29, 1952 |
| 1,073,507 | France | Sept. 27, 1954 |